(12) United States Patent
Mori

(10) Patent No.: US 8,434,789 B2
(45) Date of Patent: May 7, 2013

(54) FRAMEWORK STRUCTURE FOR VEHICLE

(75) Inventor: Takeo Mori, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/128,811

(22) PCT Filed: Mar. 2, 2009

(86) PCT No.: PCT/JP2009/053874
§ 371 (c)(1),
(2), (4) Date: May 11, 2011

(87) PCT Pub. No.: WO2010/100714
PCT Pub. Date: Sep. 10, 2010

(65) Prior Publication Data
US 2011/0304128 A1    Dec. 15, 2011

(51) Int. Cl.
*B62D 21/00* (2006.01)
(52) U.S. Cl.
USPC ........................................................ 280/781
(58) Field of Classification Search .................. 280/781, 280/785, 786, 797, 800
See application file for complete search history.

(56) References Cited

FOREIGN PATENT DOCUMENTS

| JP | 01269679 A | * | 10/1989 |
| JP | 2003-252234 A | | 9/2003 |
| JP | 2003261072 A | * | 9/2003 |
| JP | 2008-162478 A | | 7/2008 |
| JP | 2008207619 A | * | 9/2008 |
| JP | 2008-290681 A | | 12/2008 |

OTHER PUBLICATIONS

International Preliminary Report on Patentability issued Sep. 22, 2011 for counterpart application PCT/JP2009/053874.

* cited by examiner

*Primary Examiner* — Faye M. Fleming
(74) *Attorney, Agent, or Firm* — Sughrue Mion, PLLC

(57) ABSTRACT

There is provided a framework structure for a vehicle where two members can be welded to each other even when the two members are disposed adjacent to each other and the extending directions thereof are changed, thereby improving strength.

A kick portion 11 of a front side member 1 includes a kick lower member 2 of which an extending direction is changed so that a front portion of the kick lower member rises, and a long kick upper member 3 that is provided along the kick lower member 2. The kick lower member 2 and the kick upper member 3 are joined to each other at a kick lower member flange middle portion 22C and a kick upper member flange middle portion 32C. The kick lower member flange middle portion 22C and the kick upper member flange middle portion 32C are formed in a linear shape.

6 Claims, 8 Drawing Sheets

FRAMEWORK STRUCTURE FOR VEHICLE

CROSS REFERENCE TO RELATED APPLICATION

This application is a National Stage of International Application No. PCT/JP2009/053874 filed Mar. 2, 2009, the contents of all of which are incorporated herein by reference in their entirety.

TECHNICAL FIELD

The present invention relates to a framework structure for a vehicle, and more particularly, to a framework structure for a vehicle where two long members are joined to each other.

BACKGROUND ART

A front side member is disposed at a front portion of a framework structure for a vehicle. Further, a kick portion of which a front portion rises is provided at the front position of the front side member (for example, Patent Literature 1). The kick portion is formed in a curved shape so as to rise toward the front side of the front side member that is disposed on the rear side of the kick portion.

In the past, a kick portion 81 of a front side member 80 shown in FIG. 8 has been known as the kick portion of this kind of front side member. The front side member 80 includes a kick lower member 82 and a kick upper member 83. In the kick portion 81 of the front side member 80, a kick upper member 83 and a kick lower member 82 are curved with substantially the same curvature and the kick lower member 82 is disposed along the kick upper member 83.

CITATION LIST

Patent Literature

[Patent Literature 1] Japanese Unexamined Patent Application Publication No. 2003-252234

SUMMARY OF INVENTION

Technical Problem

However, it is difficult to accurately form a curved shape between a kick upper member 83 and a kick lower member 82 at the kick portion 81 of the front side member 80 shown in FIG. 8. For this reason, since it is difficult to join the kick upper member 83 to the kick lower member 82 at a curved portion of the kick portion 81 by welding or bolting, welding Y is performed at a position except for the kick portion 81. As a result, the kick upper member is inevitably not joined to the kick lower member at the kick portion 81. If the kick upper member 83 and the kick lower member 82 are not joined to each other as described above, there is a problem in that it is difficult to improve the strength of the kick portion. Even when two members are disposed adjacent to each other and the extending directions of the members are changed, this problem occurs.

Accordingly, an object of the invention is to provide a framework structure for a vehicle where two members can be welded to each other even when the two members are disposed adjacent to each other and the extending directions thereof are changed, thereby improving strength.

Solution to Problem

A framework structure for a vehicle according to the invention, which attains the object, is provided on the front side of a vehicle and includes a front side member provided with a kick portion. The kick portion of the front side member includes a long kick lower member that includes an extending direction-change portion of which an extending direction is changed so that a front portion of the extending direction-change portion rises, and a long kick upper member that is provided along the kick lower member and includes an extending direction-change portion of which an extending direction is changed so that a front portion of the extending direction-change portion rises. The kick lower member and the kick upper member are joined to each other so that a lower surface of the kick lower member and an upper surface of the kick upper member are adjacent to each other. Linear portions are formed at a joined portion of the extending direction-change portion of the kick lower member that is joined to the kick upper member and a joined portion of the extending direction-change portion of the kick upper member that is joined to the kick lower member, respectively.

In the framework structure for a vehicle according to the invention, the linear portions are formed at the joined portion of the extending direction-change portion of the kick lower member that is joined to the kick upper member and the joined portion of the extending direction-change portion of the kick upper member that is joined to the kick lower member, respectively. For this reason, it may be possible to reliably join the joined portion between the kick lower member and the kick upper member by welding or the like. Accordingly, it may be possible to weld two members even when the two members are disposed adjacent to each other and the extending directions thereof are changed, thereby improving strength.

Here, kick lower member flanges may be formed on the upper surface of the kick lower member, and a kick upper member flange may be formed on the lower surface of the kick upper member. The joined portions may be formed at the kick lower member flanges and the kick upper member flange.

Since the joined portions are formed at the kick lower member flange and the kick upper member flange as described above, it may be possible to easily form the joined portion between the kick lower member and the kick upper member.

Further, the linear portions may be formed beyond a curved apex of the kick portion of the front side member.

The curved apex of the kick portion is a point where an input of a load becomes the maximum. For this reason, since the linear portions are formed beyond the curved apex of the kick portion of the front side member, it may be possible to join the kick lower member to the kick upper member at the kick portion-curved apex X where an input of a load becomes the maximum. Accordingly, it may be possible to solidly form the cross-section of the kick portion of the front side member.

Furthermore, a distance between a front end portion of the linear portion and the curved apex and a distance between a rear end portion of the linear portion and the curved apex may be substantially equal to each other.

Since the distance between the front end portion of the linear portion and the curved apex and the distance between the rear end portion of the linear portion and the curved apex are substantially equal to each other as described above, it may be possible to evenly distribute a load that is input to the curved apex. As a result, it may be possible to solidly form the cross-section of the kick portion of the front side member.

Moreover, a mating plane between the kick lower member and the kick upper member may be set within an upper one-third range of the kick portion.

Since the mating plane between the kick lower member and the kick upper member is set within an upper one-third range of the kick portion as described above, it may be possible to dispose a welded portion on the side to be compressed when a load is input to the front side member and the front side member is to be buckled. For this reason, it may be possible to solidly form the cross-section of the kick portion of the front side member.

Meanwhile, a framework structure for a vehicle according to the invention, which attains the object, is provided in a vehicle. The framework structure includes a first long member which has a long shape and of which an extending direction is changed, and a second long member which has a long shape and is provided along the first long member and of which an extending direction is changed. The first long member and the second long member are joined to each other so that side surfaces of the first long member and the second long member are adjacent to each other. Linear portions are formed at a joined portion of the first long member joined to the second long member and a joined portion of the second long member joined to the second long member that are extending direction-change portions of the first and second long members of which the extending directions are changed.

In the framework structure for a vehicle according to the invention, the linear portions are formed at the joined portion of the first long member joined to the second long member and the joined portion of the second long member joined to the second long member that are the extending direction-change portions of the first and second long members of which the extending directions are changed. For this reason, it may be possible to reliably join the joined portion of the first long member, which is joined to the second long member, by welding or the like. Accordingly, it may be possible to weld two long members even when the two long members are disposed adjacent to each other and the extending directions thereof are changed, thereby improving strength.

Meanwhile, the "long shape where an extending direction is changed" in the invention means a shape where a long linear member is curved or bent. Further, the "side surfaces of a long member" mean the surfaces of a long member except for end surfaces that are positioned at end portions of the long member, respectively. Accordingly, the side surfaces of the invention include not only the side surfaces of the long member that are positioned laterally in the longitudinal direction of the long member but also the upper and lower surfaces of the long member that are positioned at the upper and lower positions in the longitudinal direction of the long member.

In addition, a framework structure for a vehicle according to the invention, which attains the object, is provided on the front side of a vehicle and includes a front side member provided with a kick portion. The kick portion of the front side member includes a long kick lower member that includes an extending direction-change portion of which an extending direction is changed so that a front portion of the extending direction-change portion rises, and a long kick upper member that is provided along the kick lower member and includes an extending direction-change portion of which an extending direction is changed so that a front portion of the extending direction-change portion rises. The kick lower member and the kick upper member are joined to each other so that a lower surface of the kick lower member and an upper surface of the kick upper member are adjacent to each other. Small-curvature portions, which have a curvature smaller than the curvature of a curve formed by connecting neutral axes of the front side member, are formed at a joined portion of the extending direction-change portion of the kick lower member that is joined to the kick upper member and a joined portion of the extending direction-change portion of the kick upper member that is joined to the kick lower member.

The joined portion of the extending direction-change portion of the kick lower member, which is joined to the kick upper member, and the joined portion of the extending direction-change portion of the kick upper member, which is joined to the kick lower member, form small-curvature portions that have a curvature smaller than the curvature of a curve formed by connecting neutral axes of the front side member. For this reason, it may be possible to reliably join the joined portion between the kick lower member and the kick upper member by welding or the like, as compared to the case where the curvature of the joined portion is equal to the curvature of a curve formed by connecting neutral axes of the front side member. Accordingly, it may be possible to weld two members even when the two members are disposed adjacent to each other and the extending directions thereof are changed, thereby improving strength.

Advantageous Effects of Invention

According to the framework structure for a vehicle of the invention, it may be possible to weld two members even when the two members are disposed adjacent to each other and the extending directions thereof are changed, thereby improving strength.

Figure 1:
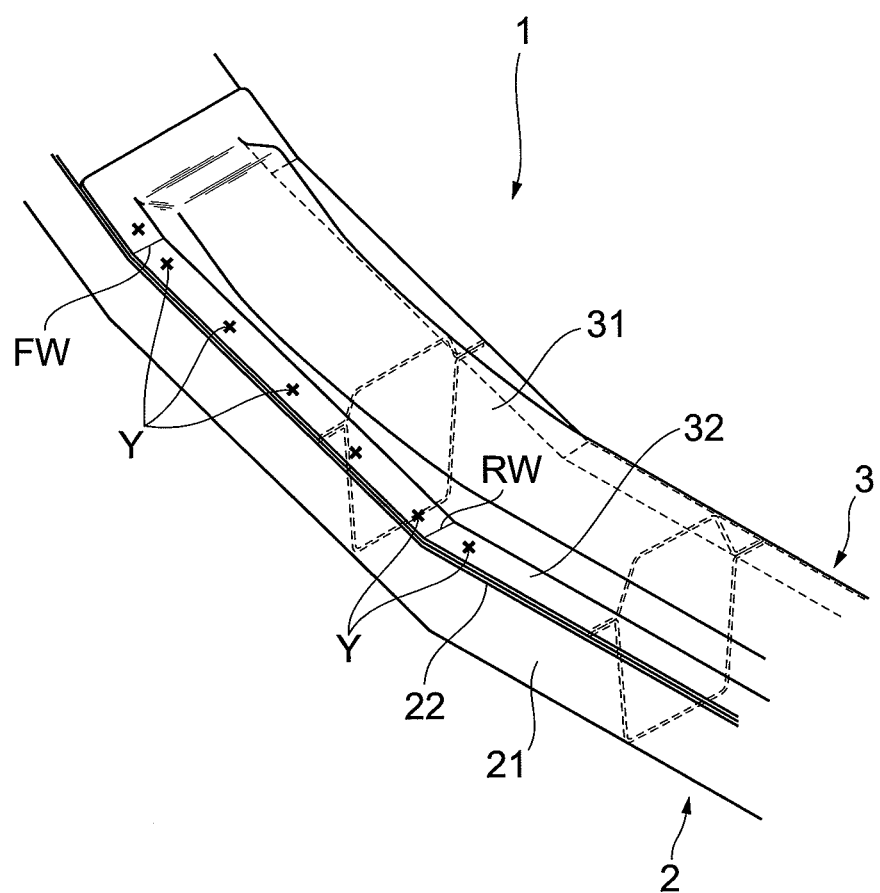
FIG. 1 is a perspective view of main portions of a framework structure for a vehicle according to a first embodiment.

DESCRIPTION OF REFERENCE SIGNS 1, 4: front side member
2, 5: kick lower member
3, 6: kick upper member
11, 12: kick portion
21: kick lower member main body
21F: kick lower member main body front portion
21C: kick lower member main body middle portion
21R: kick lower member main body rear portion
22: kick lower member flange
22F: kick lower member flange front portion
22C: kick lower member flange middle portion
22R: kick lower member flange rear portion
31: kick upper member main body
31F: kick upper member main body front portion 31C: kick upper member main body middle portion
31R: kick upper member main body rear portion
32: kick upper member flange
32F: kick upper member flange front portion
32C: kick upper member flange middle portion
32R: kick upper member flange rear portion
RW: rear bent portion
FW: front bent portion
L: adjacent line
NA: neutral axis
PF: mating plane
X: kick portion-curved apex
Y: welding point

DESCRIPTION OF EMBODIMENTS

Embodiments of the invention will be described in detail below with reference to the accompanying drawings. Meanwhile, the same elements in the description of the drawings are denoted by the same reference numerals, and the repeated description will be omitted. Further, for convenience of illustration, the ratio of the dimension in the drawings does not necessarily correspond to an object to be described.

Figure 2:
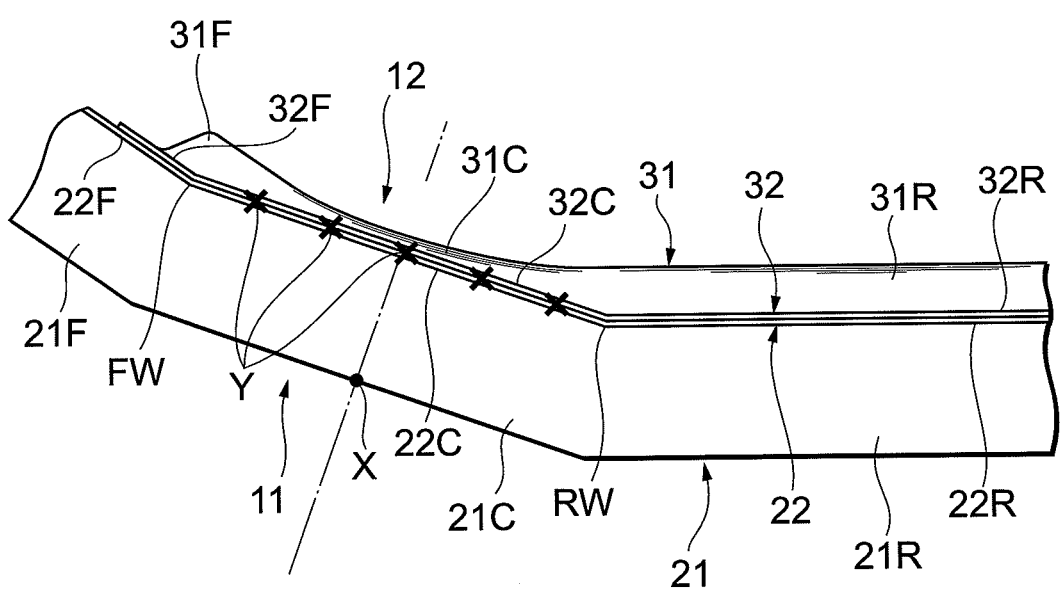
FIG. 2 is a side view of main portions of the framework structure for a vehicle according to the first embodiment.
Figure 3:
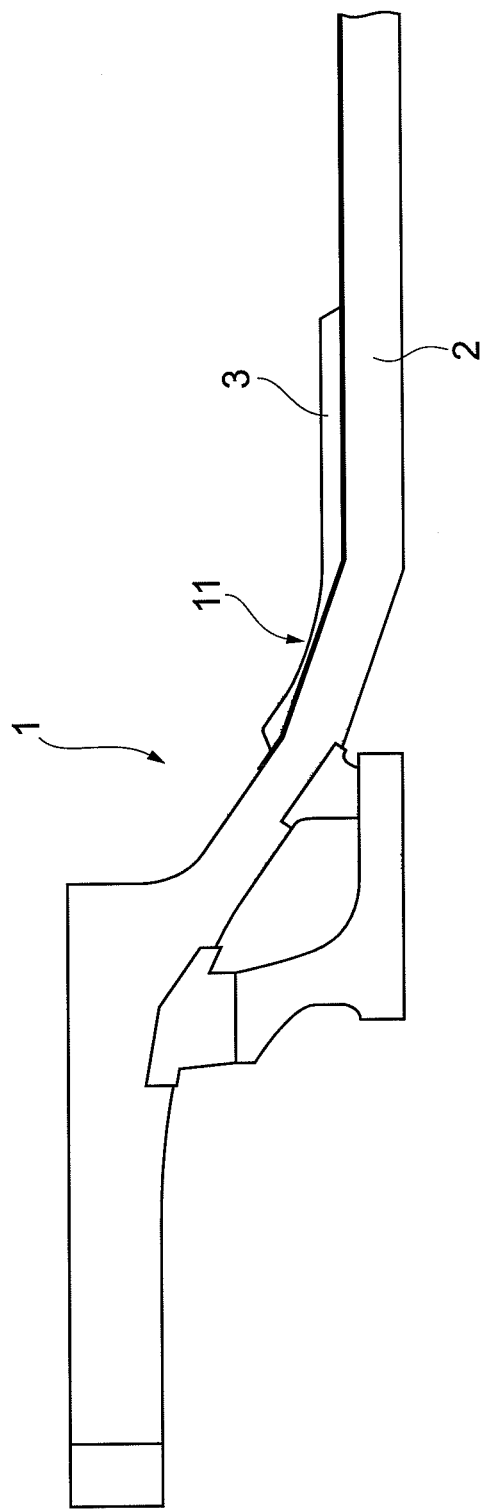
FIG. 3 is a side view of the framework structure for a vehicle according to the first embodiment.

FIG. 1 is a perspective view of a framework structure for a vehicle according to a first embodiment. As shown in FIGS. 1 and 2, the framework structure for a vehicle according to this embodiment includes a front side member 1 that is provided on the front side of a vehicle. As shown in FIG. 3, the front side member 1 includes a long kick lower member 2 that extends in the longitudinal direction of the vehicle.

Further, the front side member 1 includes a kick portion 11 of which the extending direction is changed so that the front portion of the kick portion rises. The front side member 1 includes an extending direction-change portion, of which the extending direction is changed so that the front portion of the extending direction-change portion rises, at the kick portion 11. The rear and front end portions of the extending direction-change portion of the kick portion 11 are bent. As shown in FIGS. 1 and 2, at the kick portion 11, the kick lower member 2 is provided at a lower portion and a long kick upper member 3 provided along the upper surface of the kick lower member 2 is provided on the kick lower member 2. Further, the upper surface of the kick lower member 2 and the lower surface of the kick upper member 3 are joined to each other while being adjacent to each other.

As shown in FIG. 1, the kick lower member 2 includes a kick lower member main body 21 that is formed so as to have a substantially U-shaped cross-section. The kick lower member is disposed so that an opening portion of the kick lower member main body 21 faces upward. Kick lower member flanges 22 are formed at both upper end pieces of the kick lower member main body 21, respectively. The kick lower member flanges 22 are formed over the substantially entire region of the kick lower member main body 21 in the extending direction of the kick lower member main body.

Further, the kick lower member main body 21 includes a kick lower member main body front portion 21F, a kick lower member main body middle portion 21C, and a kick lower member main body rear portion 21R. Furthermore, the kick lower member flange 22 includes a kick lower member flange front portion 22F, a kick lower member flange middle portion 22C, and a kick lower member flange rear portion 22R.

All of the kick lower member flange front portion 22F, the kick lower member flange middle portion 22C, and the kick lower member flange rear portion 22R have a linear shape in side view. Further, a bent portion (hereinafter, referred to as a "front bent portion") FW is formed between the kick lower member flange front portion 22F and the kick lower member flange middle portion 22C. Furthermore, a bent portion (hereinafter, referred to as a "rear bent portion") RW is formed between the kick lower member flange middle portion 22C and the kick lower member flange rear portion 22R. For this reason, the kick lower member flange 22 has a long shape where the extending direction is changed, and the kick lower member flange middle portion 22C becomes the extending direction-change portion.

The kick upper member 3 includes a kick upper member main body 31 that is formed so as to have a substantially U-shaped cross-section. The kick upper member is disposed so that an opening portion of the kick upper member main body 31 faces downward. A kick upper member flange 32 is formed around the lower end pieces of the kick upper member main body 31.

Further, the kick upper member main body 31 includes a kick upper member main body front portion 31F, a kick upper member main body middle portion 31C, and a kick upper member main body rear portion 31R. Furthermore, the kick upper member flange 32 includes a kick upper member flange front portion 32F, a kick upper member flange middle portion 32C, and a kick upper member flange rear portion 32R.

All of the kick upper member flange front portion 32F, the kick upper member flange middle portion 32C, and the kick upper member flange rear portion 32R have a linear shape in side view. Further, a front bent portion FW is formed between the kick upper member flange front portion 32F and the kick upper member flange middle portion 32C, and a rear bent portion RW is formed between the kick upper member flange middle portion 32C and the kick upper member flange rear portion 32R. For this reason, the kick upper member flange 32 has a long shape where the extending direction is changed, and the kick upper member flange middle portion 32C becomes the extending direction-change portion.

Both the kick lower member flange middle portion 22C and the kick upper member flange middle portion 32C are formed beyond a kick portion-curved apex X shown in FIG. 3. Further, the front bent portion FW is disposed at a front position of the kick portion-curved apex X, and the rear bent portion RW is disposed at a rear position of the kick portion-curved apex X. Furthermore, the kick portion-curved apex X is disposed at a position that is substantially equidistant from both the front bent portion FW and the rear bent portion RW.

Moreover, the kick lower member 2 and the kick upper member 3 are welded to each other at welding points Y through the kick lower member flange 22 and the kick upper member flange 32, respectively. Accordingly, the kick lower member and the kick upper member are joined to each other. These welding points Y are set between the kick lower member flange front portion 22F and the kick upper member flange front portion 32F, between the kick lower member flange middle portion 22C and the kick upper member flange middle portion 32C, and between the kick lower member flange rear portion 22R and the kick upper member flange rear portion 32R. The kick lower member 2 and the kick upper member 3 are integrated in this way.

Figures 4A, 4B:
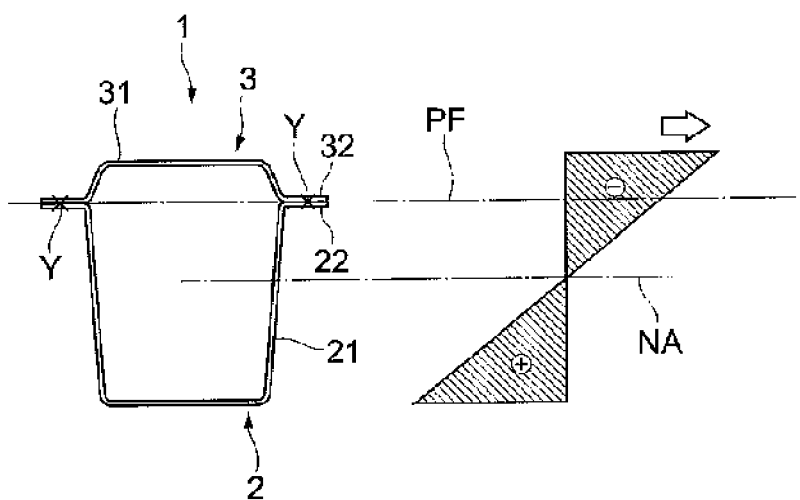
FIG. 4A is a front cross-sectional view of a kick portion of this embodiment and FIG. 4B is a view showing the stress distribution corresponding to the kick portion of this embodiment.

In addition, the height of the kick upper member 3 is set to be larger than that of the kick lower member 2. For this reason, as shown in FIG. 4A, a mating plane PF between the kick lower member flange 22 of the kick lower member 2 and the kick upper member flange 32 of the kick upper member 3 is disposed at an upper portion of the kick portion 11 of the front side member 1 in a height direction. More specifically, the mating plane PF between the kick lower member flange 22 and the kick upper member flange 32 is disposed at a height position within ⅓ from the upper end of the kick portion 11.

Next, the operation of the framework structure for a vehicle according to this embodiment will be described. In the front side member 1 of the framework structure for a vehicle according to this embodiment, the kick lower member 2 and the kick upper member 3 are disposed at the lower and upper positions of the kick portion 11. Here, the kick lower member flange middle portion 22C and the kick upper member flange middle portion 32C, which become the extending direction-change portions, are formed at the kick lower member 2 and the kick upper member 3. All of the extending direction-change portions of the kick lower member flange middle portion and the kick upper member flange middle portion are formed in a linear shape. For this reason, it may be possible to join the kick lower member flange middle portion 22C to the kick upper member flange middle portion 32C by welding. Accordingly, it may be possible to improve the strength of the kick portion 11 of the front side member 1.

Further, both the kick lower member flange middle portion 22C and the kick upper member flange middle portion 32C are formed beyond the kick portion-curved apex X shown in FIG. 3. The kick portion-curved apex X is a point where an input of a load caused by an impact or the like becomes the maximum. Accordingly, since it may be possible to join the kick lower member 2 to the kick upper member 3 at the kick portion-curved apex X where an input of a load becomes the maximum, it may be possible to solidly form the cross-section of the kick portion 11 of the front side member 1. Therefore, it may be possible to suitably suppress the deformation of the cross-section of the kick portion 11 and to improve the buckling strength of the cross-section.

Furthermore, the kick portion-curved apex X is disposed at a position that is substantially equidistant from both the front bent portion FW and the rear bent portion RW. For this reason, it may be possible to evenly distribute a load that is input to the curved apex X of the front side member 1. Moreover, the mating plane PF between the kick lower member flange 22 and the kick upper member flange 32 is disposed at a height position within ⅓ from the upper end of the kick portion 11. For this reason, it may be possible to dispose a welded portion on the side that is compressed when the front side member 1 is buckled by a load input to the front side member 1. Therefore, it may be possible to further solidly form the cross-section of the kick portion 11 of the front side member 1.

Further, the kick lower member 2 and the kick upper member 3 are joined to each other so as to be integrated, so that the kick lower member 2 and the kick upper member 3 share stress as one member. For this reason, it may be possible to increase a bending reaction force that is generated in the cross-section. In this way, it may be possible to improve the bending strength of the kick portion 11 of the front side member 1 and to improve the strength of the kick portion 11 of the front side member 1.

On the other hand, since a reinforcing member or the like does not need to be provided to improve the strength of the front side member 1, it may be possible to reduce the mass or the number of parts. Moreover, the kick lower member flange middle portion 22C of the kick lower member 2 and the kick upper member flange middle portion 32C of the kick upper member 3 are formed in a linear shape. Accordingly, it may be possible to manufacture the kick lower member 2 and the kick upper member 3 by not only roll roaming but also press forming. Therefore, it may be possible to easily manufacture the kick lower member and the kick upper member.

Figure 8:
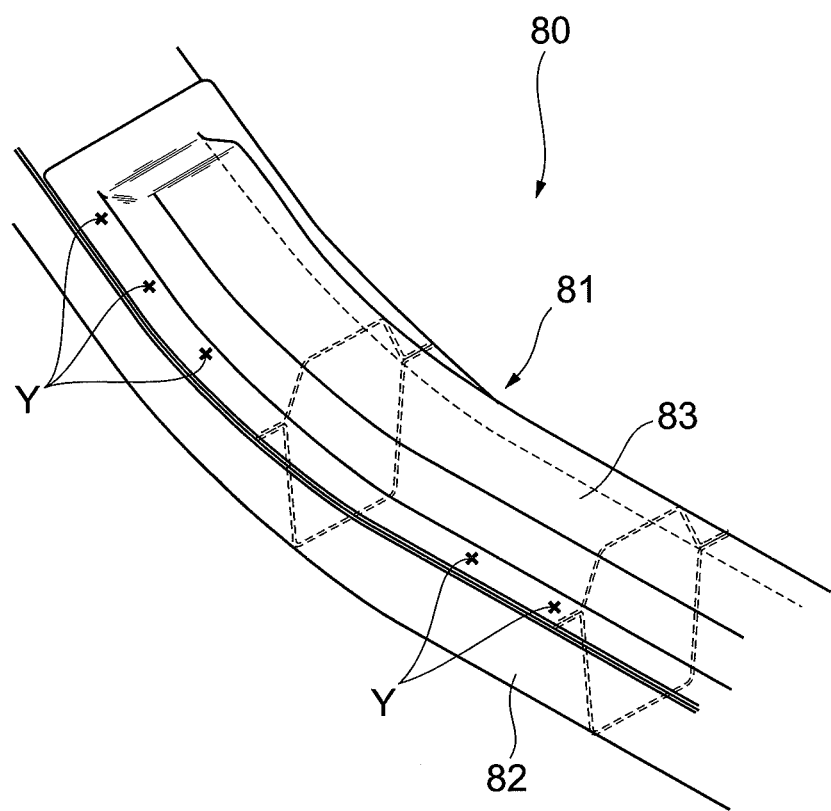
FIG. 8 is a perspective view of main portions of a framework structure for a vehicle in the related art.

Subsequently, the comparison of the strength of the front side member 1 of this embodiment and the strength of the front side member 80 in the related art shown in FIG. 8 will be described. FIG. 4A is a front cross-sectional view of the kick portion of the front side member of this embodiment and FIG. 4B is a view showing the stress distribution corresponding to the kick portion of this embodiment. Further, FIG. 5A is a front cross-sectional view of a kick portion of a front side member in the related art and FIG. 5B is a view showing the stress distribution corresponding to the kick portion in the related art.

As shown in FIG. 4A, at the kick portion 11 of the front side member 1 according to this embodiment, the kick lower member flange 22 of the kick lower member 2 and the kick upper member flange 32 of the kick upper member 3 are fixed to each other by welding Y. For this reason, the deformation of the cross-section is suppressed as shown in FIG. 4B, so that it may be possible to increase the strength of a member up to the strength limit of a material of the member. Further, since the kick lower member 2 and the kick upper member 3 can be integrated as shown in FIG. 4B, the distance from a neutral axis NA of the front side member 1 is increased. Accordingly, it may be possible to improve the bending reaction force of a cross-section.

Figures 5A, 5B:
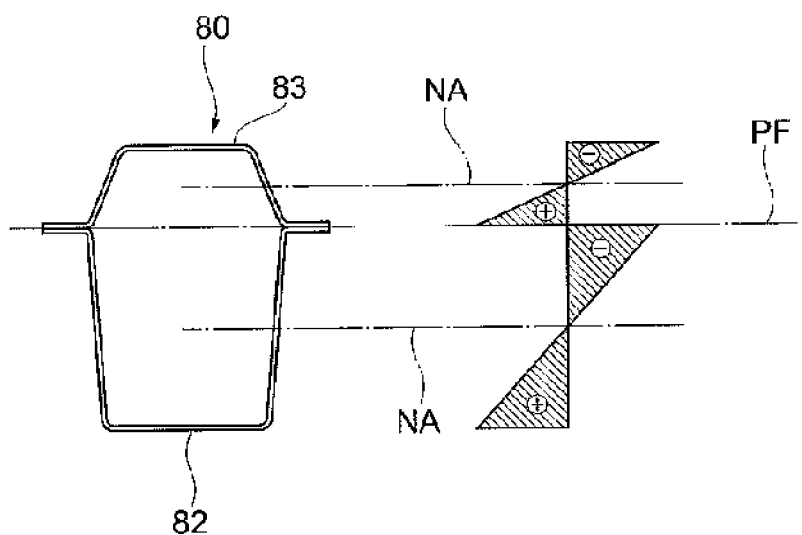
FIG. 5A is a front cross-sectional view of a kick portion in the related art and FIG. 5B is a view showing the stress distribution corresponding to the kick portion in the related art.

In contrast, at a kick portion 81 of a front side member 80 in the related art shown in FIG. 5A, a kick lower member 82 and a kick upper member 83 are not joined to each other and the kick lower member 82 and the kick upper member 83 are formed separately from each other. For this reason, the deformation of the cross-section of the front side member 80 is increased. As a result, the front side member 80 is buckled before the cross-section reaches the upper limit of the strength of a material. Moreover, the kick lower member 82 and the kick upper member 83 are independently bent. For this reason, as shown in FIG. 5B, each of the kick lower member 82 and the kick upper member 83 has a neutral axis NA. Accordingly, a distance from the neutral axis NA becomes short, so that the bending reaction forces of the kick lower member and the kick upper member become insufficient.

Since linear portions are formed at the kick lower member flange middle portion 22C and the kick upper member flange middle portion 32C in the front side member 1 of this embodiment as described above, it may be possible to fix the kick lower member 2 to the kick upper member 3 at the extending direction-change portions thereof by welding. As a result, it may be possible to solidly form the cross-section of the kick portion 11 of the front side member 1. Therefore, it may be possible to suitably suppress the deformation of the cross-section of the kick portion 11 and to improve the buckling strength of the cross-section.

Figure 6:
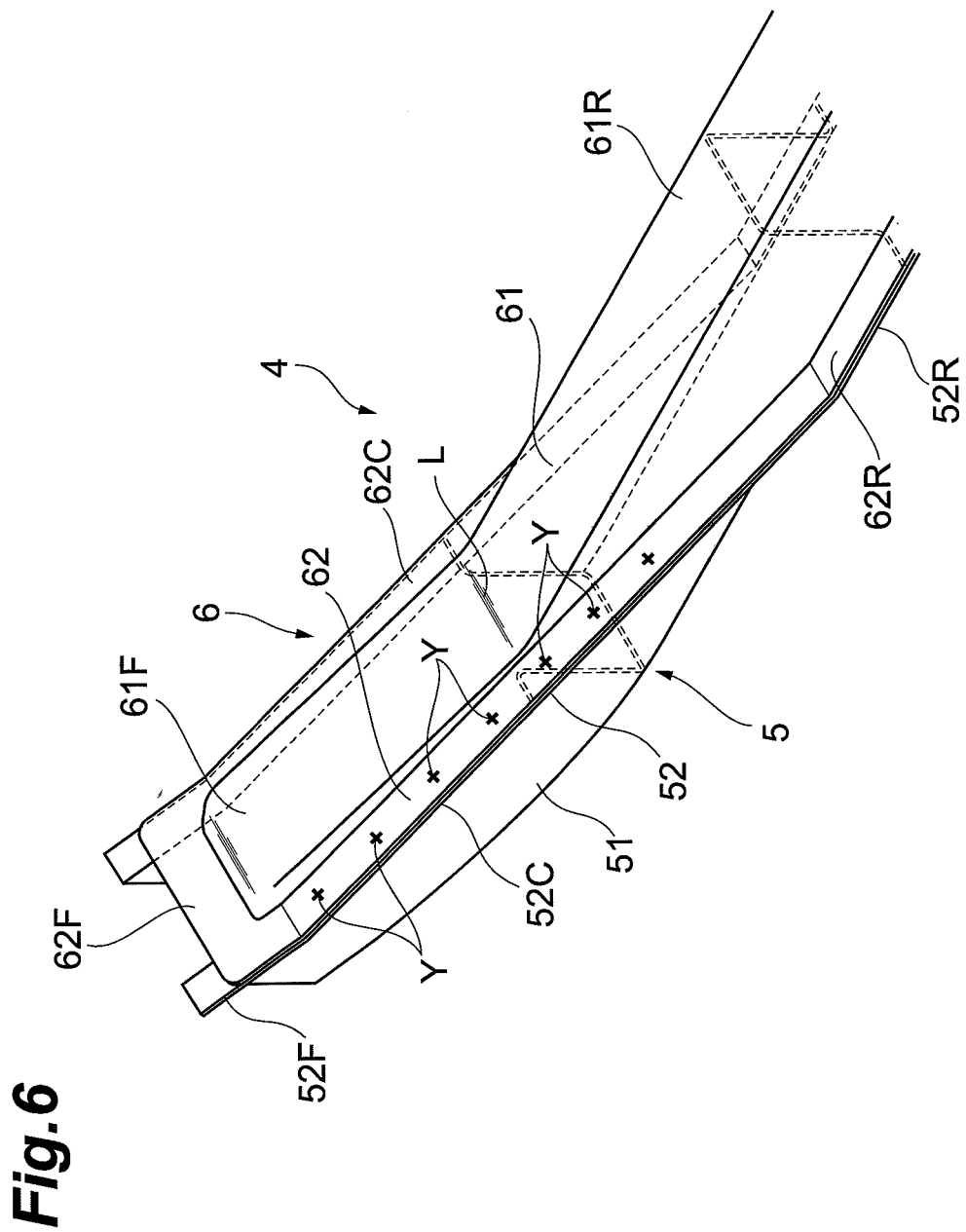
FIG. 6 is a perspective view of main portions of a framework structure for a vehicle according to a second embodiment.
Figure 7:
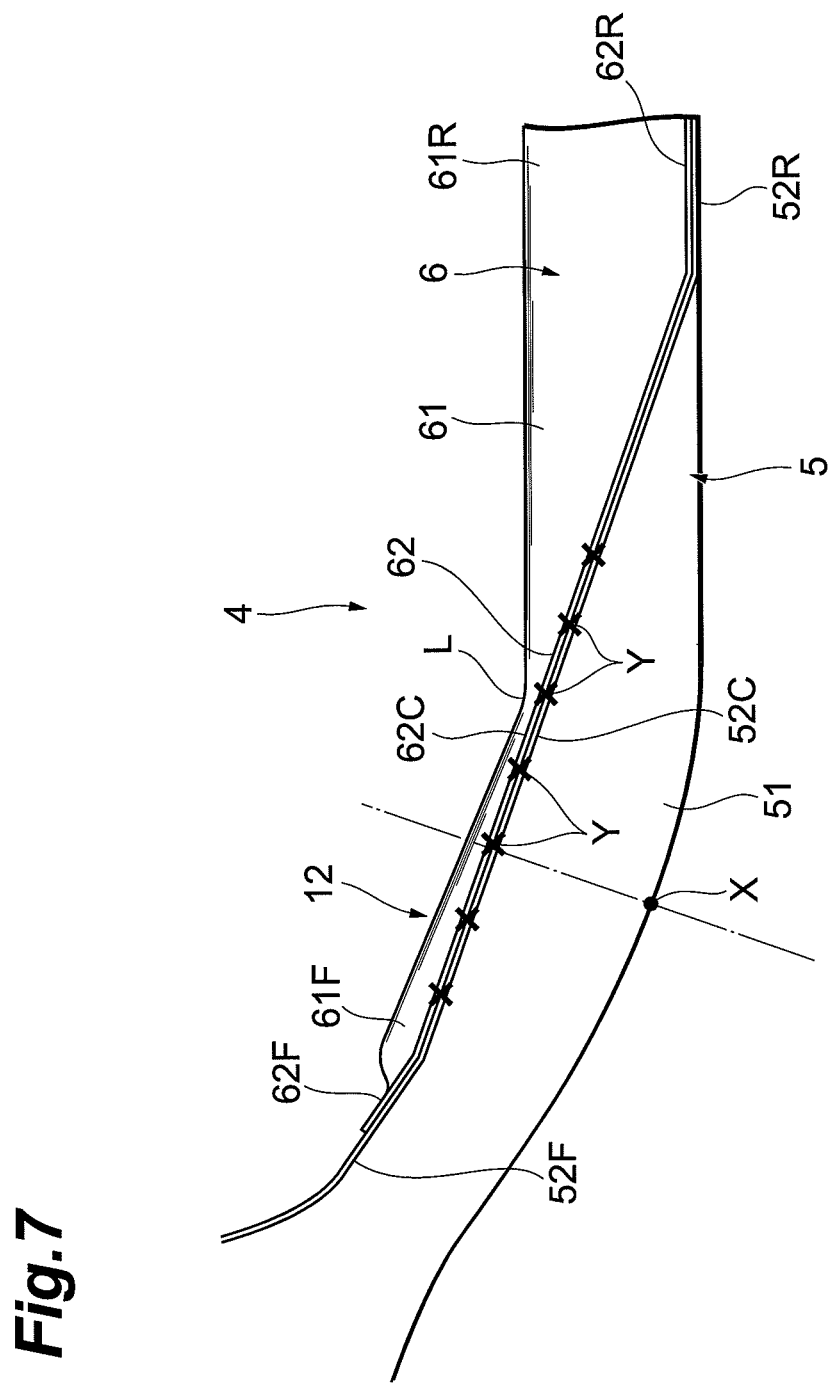
FIG. 7 is a side view of main portions of the framework structure for a vehicle according to the second embodiment.

Next, a second embodiment of the invention will be described. FIG. 6 is a perspective view of main portions of a framework structure for a vehicle according to a second embodiment. FIG. 7 is a side view of main portions of the framework structure for a vehicle.

As shown in FIGS. 6 and 7, the framework structure for a vehicle according to this embodiment includes a front side member 4 and a kick lower member 5 and a kick upper member 6 are provided at a kick portion 12 of the front side member 4.

The kick lower member 5 includes a kick lower member main body 51 that is formed so as to have a substantially U-shaped cross-section. The kick lower member is disposed so that an opening portion of the kick lower member main body 51 faces upward. Further, the kick lower member main body 51 of the kick lower member 5 is formed so that the width of the kick lower member main body in a height direction is decreased toward the rear side. Furthermore, as shown in FIG. 7, the kick lower member main body is formed in a shape where the width of the kick lower member main body in the height direction is decreased at the rear end portion of the kick lower member main body 51 and the kick lower member main body is absorbed in the bottom.

Further, kick lower member flanges 52 are formed at both upper end pieces of the kick lower member main body 51, respectively. The kick lower member flanges 52 are formed over the substantially entire region of the kick lower member main body 51 in the extending direction of the kick lower member main body. Furthermore, the kick lower member flange 52 includes a kick lower member flange front portion 52F and a kick lower member flange rear portion 52R. A front bent portion is formed between the kick lower member flange front portion 52F and the kick lower member flange rear portion 52R.

The kick upper member 6 includes a front kick upper member main body 61F that is formed as to have a substantially U-shaped cross-section and a rear kick upper member main body 61R that is formed as to have a substantially U-shaped cross-section. The kick upper member is disposed so that opening portions of the kick upper member main bodies 61F and 61R face downward. The front kick upper member main body 61F is formed in a shape where the width in the height direction is decreased toward the rear side. Further, the rear kick upper member main body 61R is formed in a shape where the width of the rear kick upper member main body in the height direction is increased from the front end portion of the rear kick upper member main body toward the rear side and the width thereof in the height direction is substantially constant on the rear side of a position corresponding to the rear end portion of the kick lower member main body 51. For this reason, a portion of the front side member 4, which is positioned on the rear side of a portion of the front side member where the kick lower member 5 and the kick upper member 6 are adjacent to each other, is formed of the kick lower member 5.

A kick upper member flange 62 is formed at the front lower end piece of the front kick upper member main body 61F and both the lower end pieces of the kick upper member main bodies 61F and 61R. The kick upper member flange 62 includes a kick upper member flange front portion 62F, a kick upper member flange middle portion 62C, and a kick upper member flange rear portion 62R.

All of the kick upper member flange front portion 62F, the kick upper member flange middle portion 62C, and the kick upper member flange rear portion 62R have a linear shape in side view. Further, a front bent portion is formed between the kick upper member flange front portion 62F and the kick upper member flange middle portion 62C, and a rear bent portion is formed between the kick upper member flange middle portion 62C and the kick upper member flange rear portion 62R. For this reason, the kick upper member flange 62 has a long shape where the extending direction is changed, and the kick upper member flange middle portion 62C becomes an extending direction-change portion.

Moreover, the kick lower member 5 and the kick upper member 6 are welded to each other at welding points Y through the kick lower member flange 52 and the kick upper member flange 62, respectively. Accordingly, the kick lower member and the kick upper member are joined to each other. These welding points Y are set between the kick lower member flange front portion 52F and the kick upper member flange front portion 62F and between the kick lower member flange rear portion 52R and the kick upper member flange middle portion 62C. The kick lower member 5 and the kick upper member 6 are integrated in this way.

In addition, an adjacent line L between the front kick upper member main body 61F and the rear kick upper member main body 61R of the kick upper member 6 is disposed at a substantially middle position between two welding points Y and Y. Further, the upper surface of the kick upper member 6 is substantially flush with the height of the kick upper member flange 62 (the height of a mating plane between the kick lower member flange 52 and the kick upper member flange 62) at the adjacent line L.

Next, the operation of the framework structure for a vehicle according to this embodiment will be described. In the front side member 4 of the framework structure for a vehicle according to this embodiment, the kick lower member 5 and the kick upper member 6 are disposed at the lower and upper positions of the kick portion 12 like in the first embodiment. Here, the kick lower member flange rear portion 52R and the kick upper member flange middle portion 62C, which become the extending direction-change portions, are formed at the kick lower member 5 and the kick upper member 6. All of the extending direction-change portions of the kick lower member flange middle portion and the kick upper member flange middle portion are formed in a linear shape. For this reason, it may be possible to join the kick lower member flange rear portion 52C to the kick upper member flange middle portion 62C by welding. Accordingly, it may be possible to improve the strength of the kick portion 12 of the front side member 4.

Moreover, since a reinforcing member or the like does not need to be provided to improve the strength of the front side member 4, it may be possible to reduce mass or the number of parts. Further, the kick lower member flange rear portion 52R of the kick lower member 5 and the kick upper member flange middle portion 62C of the kick upper member 6 are formed in a linear shape. Accordingly, it may be possible to manufacture the kick lower member 5 and the kick upper member 6 by not only roll roaming but also press forming. Therefore, it may be possible to easily manufacture the kick lower member and the kick upper member.

Furthermore, in the framework structure for a vehicle according to this embodiment, the upper surface of the kick upper member 6 is substantially flush with the height of the kick upper member flange 62 at an adjacent line L between the front kick upper member main body 61F and the rear kick upper member main body 61R. For this reason, the closed cross-section of the kick upper member 6 is divided before and behind the adjacent line L. Accordingly, since the kick upper member 6 is formed of two portions that are formed by bending, it may be possible to improve part accuracy.

Moreover, the kick upper member flange middle portion 62C of the kick upper member 6 is formed over a long distance between the front kick upper member main body 61F and the rear kick upper member main body 61R. For this reason, a long distance of a mating plane between the kick lower member 5 and the kick upper member 6 corresponds to a linear portion. Accordingly, it may be possible to significantly improve part accuracy.

The preferred embodiments of the invention have been described above. However, the invention is not limited to the above-mentioned respective embodiments, and may have various modifications. For example, the kick lower member flange middle portion 22C and the kick upper member flange middle portion 32C have been formed in a linear shape in the above-mentioned embodiments, but may be formed in the shape of a curve having a small curvature. The curvature in this case is set to be smaller than the curvature of a curve that connects the neutral axis of the kick lower member main body middle portion 21C of the front side member 1 to the neutral axis of the kick upper member main body middle portion 31C. Further, the kick lower member and the kick upper member have been joined to each other by welding, but may be joined to each other by other aspects such as bolting.

Furthermore, each of the kick lower member flange front portion 22F, the kick lower member flange rear portion 22R, the kick upper member flange front portion 32F, and the kick upper member flange rear portion 32R has been formed in a linear shape in the above-mentioned embodiments, but may be formed in a curved shape.

In addition, the extending direction-change portions of the kick lower member main body 21 and the kick upper member main body 31 have been formed in a linear shape, but may be formed in a curved shape. Further, a front side member has been described as a framework structure for a vehicle in the above-mentioned embodiments. However, the invention may be applied to other parts, for example, a rear side member and the like.

INDUSTRIAL APPLICABILITY

The invention relates to a framework structure for a vehicle, and may be used for, particularly, a framework structure for a vehicle where two long members are joined to each other.

The invention claimed is:

1. A framework structure for a vehicle that is provided on the front side of a vehicle and includes a front side member provided with a kick portion,
    wherein the kick portion of the front side member includes a long kick lower member that includes an extending direction-change portion of which an extending direction is changed so that a front portion of the extending direction change portion rises, and a long kick upper member that is provided along the kick lower member and includes an extending direction-change portion of which an extending direction is changed so that a front portion of the extending direction-change portion rises,
    the kick lower member and the kick upper member are joined to each other so that an upper surface of the kick lower member and a lower surface of the kick upper member are adjacent to each other, and
    small-curvature portions, which have a curvature smaller than the curvature of a curve formed by connecting neutral axes of the front side member, are formed at a joined portion of the extending direction-change portion of the kick lower member that is joined to the kick upper member and a joined portion of the extending direction-change portion of the kick upper member that is joined to the kick lower member.

2. The framework structure for a vehicle according to claim 1,
    wherein a kick lower member flange is formed on the upper surface of the kick lower member, and a kick upper member flange is formed on the lower surface of the kick upper member, and
    the joined portions are formed at the kick lower member flange and the kick upper member flange.

3. The framework structure for a vehicle according to claim 2,
    wherein the small-curvature portions are formed beyond a curved apex of the kick portion of the front side member.

4. The framework structure for a vehicle according to claim 3,
    wherein a distance between a front end portion of the small-curvature portion and the curved apex and a distance between a rear end portion of the small-curvature portion and the curved apex are substantially equal to each other.

5. The framework structure for a vehicle according to claim 1,
    wherein a mating plane between the kick lower member and the kick upper member is set within an upper one-third range of the kick portion.

6. A framework structure for a vehicle that is provided in a vehicle, the framework structure comprising:
    a first long member which has a long shape and of which an extending direction is changed; and
    a second long member which has a long shape and is provided along the first long member and of which an extending direction is changed,
    wherein the first long member and the second long member are joined to each other so that side surfaces of the first long member and the second long member are adjacent to each other, and
    small-curvature portions, which have a curvature smaller than the curvature of a curve formed by connecting a neutral axis of the first long member to a neutral axis of the second long member, are formed at a joined portion of the first long member joined to the second long member and a joined portion of the second long member joined to the first long member that are extending direction-change portions of the first and second long members of which the extending directions are changed.

* * * * *